UNITED STATES PATENT OFFICE.

FRITZ ROESSLER, OF FRANKFORT-ON-THE-MAIN, GERMANY, ASSIGNOR TO THE ROESSLER & HASSLACHER CHEMICAL COMPANY, OF NEW YORK, N. Y., A FIRM.

METHOD OF MAKING SODIUM CYANID.

SPECIFICATION forming part of Letters Patent No. 716,350, dated December 16, 1902.

Original application filed February 4, 1899, Serial No. 704,564. Divided and this application filed March 11, 1902. Serial No. 97,790. (No specimens.)

*To all whom it may concern:*

Be it known that I, FRITZ ROESSLER, a subject of the Emperor of Germany, and a resident of Frankfort-on-the-Main, Germany, (whose postal address is No. 4 Schneidwallgasse,) have invented certain new and useful Improvements in the Manufacture of Sodium Cyanid, of which the following is a specification.

Several processes have been published by which cyanid of sodium is manufactured by passing gases containing hydrocyanic acid through an aqueous solution of caustic soda. To obtain a marketable product, the solution of cyanid has to be evaporated in a vacuum, which process involves losses of sodium cyanid by decomposition. If a very concentrated solution of caustic soda be used to absorb the hydrocyanic acid, crystals of $NaCy+2aq$ will be deposited in the absorber. These crystals must be freed from their water of crystallization, which process also involves losses by decomposition of the cyanid.

In my application Serial No. 704,564, filed February 4, 1899, and of which this application is a division, I have shown that the sodium cyanid $NaCy+2aq$ as obtained from an aqueous solution by cooling melts at 33° centigrade in its water of crystallization, whereby about forty per cent. of the NaCy is precipitated as a crystalline powder of anhydrous NaCy and can easily be separated from the remaining solution.

This invention offers a way to obtain anhydrous NaCy from gases containing hydrocyanic acid without any loss. I proceed as follows: The gases containing the hydrocyanic acid pass an absorber containing a highly-concentrated solution of caustic soda, which is kept at a temperature above 33° centigrade—for instance, at 50° centigrade. At this temperature anhydrous NaCy is precipitated in the absorber as soon as the concentration of the NaCy becomes higher than five hundred and seventeen grams NaCy per liter. The precipitated NaCy is a crystalline powder which can easily be separated from the warm solution by filtering. The solution is used again for absorbing hydrocyanic after adding new caustic soda to get again a highly-concentrated caustic solution.

I claim—

The method substantially as hereinbefore set forth of obtaining anhydrous cyanid of sodium by passing gases containing hydrocyanic acid through a highly-concentrated solution of caustic soda at a temperature above 33° centigrade.

In testimony whereof I have signed my name to this specification in the presence of two subscribing witnesses.

FRITZ ROESSLER.

Witnesses:
  JEAN GRUND,
  CARL GRUND.